US006543580B1

(12) United States Patent
Gathmann et al.

(10) Patent No.: US 6,543,580 B1
(45) Date of Patent: Apr. 8, 2003

(54) LUBRICATION APPARATUS AND METHOD OF APPLYING A LUBRICANT

(75) Inventors: Egon Gathmann, Remscheid (DE); Helmut Weigend, Radevormwald (DE)

(73) Assignee: Barmag AG, Remscheid (DE)

( * ) Notice: Subject to any disclaimer, the term of this patent is extended or adjusted under 35 U.S.C. 154(b) by 0 days.

(21) Appl. No.: 09/536,098

(22) Filed: Mar. 24, 2000

(30) Foreign Application Priority Data

Mar. 25, 1999 (DE) ........................................ 199 13 439
Jun. 16, 1999 (DE) ........................................ 199 27 366

(51) Int. Cl.[7] ............................................... F16N 27/00
(52) U.S. Cl. ....................... 184/7.4; 57/295; 222/145.6; 222/136; 118/420
(58) Field of Search .......................... 184/7.4; 222/136, 222/145.1, 145.2, 145.5, 145.6, 145.7; 57/7, 292, 295, 309, 362; 118/420, 429, DIG. 18, DIG. 19

(56) References Cited

U.S. PATENT DOCUMENTS 3,783,596 A 1/1974 Waldkirch
4,100,724 A * 7/1978 Bous .......................... 239/574
4,437,812 A * 3/1984 Abu-Shumays et al. . 210/198.2
4,490,969 A * 1/1985 Simpson et al. .............. 57/217
5,181,401 A * 1/1993 Hodan ........................ 118/420
5,744,089 A * 4/1998 Woodside et al. ....... 242/129.1

* cited by examiner

*Primary Examiner*—Chong H. Kim
(74) *Attorney, Agent, or Firm*—Alston & Bird LLP

(57) ABSTRACT

An apparatus and method for applying a lubricant to an advancing yarn, to facilitate the further processing of the yarn, and wherein the lubricant is composed of a plurality of components such as an emulsion of water and oil. The apparatus includes separate containers for the components of the lubricant, and a feed device for combining and mixing the components in a mixing chamber. The feed device also includes a pump for delivering the resulting lubricant to a wetting device which applies a metered quantity of the lubricant to the yarn. Provision is also made for maintaining a desired mixing ratio of the components of the lubricant.

7 Claims, 6 Drawing Sheets

LUBRICATION APPARATUS AND METHOD OF APPLYING A LUBRICANT

BACKGROUND OF THE INVENTION

The present invention relates to a lubrication apparatus and a method of applying to an advancing yarn a lubricant consisting of a plurality of components, as well as to a lubrication pump for carrying out the method.

In the production of a freshly spun multifilament yarn, it is necessary to apply to the yarn a lubricant for further processing. Having applied the lubricant to the yarn, it is possible to guide the yarn safely, without damaging individual filaments, over contact surfaces, such as, for example, yarn guides or godets. On the other hand, the lubricant application leads to a cohesion of the filaments in the yarn. Lubricants in use are liquid emulsions, which are prepared by combining several components, for example, water and oil.

U.S. Pat. No. 3,783,596 discloses, for example, a lubrication apparatus, wherein an emulsified lubricant for lubricating the yarn is kept in a supply container. The supply container connects to a feed device, which delivers the lubricant in a metered volume flow to a wetting device. The wetting device applies the lubricant to the yarn. In this apparatus, the feed device is designed and constructed as a lubrication pump. Such lubrication pumps are constructed as single pumps with only one outlet or as multiple pumps with a plurality of outlets. Each pump outlet connects to a connection line leading to a wetting device. The lubrication pump receives an emulsified lubricant via a pump inlet.

However, such emulsified lubricants have only a limited shelf life, since bacteria start to grow as the storage time increases. The bacteria lead to gassing, which becomes noticeable in the form of bubbles. These gas inclusions in the lubricant cause a faulty application to the yarn in the wetting device, so that the yarn exhibits lubricant gaps, which result in filament breaks. In addition, it is necessary to clean the entire lubrication apparatus at regular intervals. A further disadvantage of the known lubrication apparatus lies in that a change of the mixing ratio of the lubricant components is possible only after the residual quantity has been used up or removed.

The known lubrication pumps deliver the emulsified lubricant in a metered quantity at a predetermined mixing ratio. In this instance, it is likewise disadvantageous that a change in the mixing ratio of the lubricant components requires consumption of the supply quantity and cleaning of the lubrication pump.

It is therefore the object of the present invention to further develop a yarn lubrication apparatus and a method of the initially described kind such that the emulsified lubricant is unable to undergo averaging.

A further object of the present invention is to provide a flexible lubrication pump, which enables a change in the mixing ratio of the lubricant components in a simple manner.

SUMMARY OF THE INVENTION

The above and other objects and advantages of the invention are achieved by the provision of a method of applying to an advancing yarn a lubricant having at least a first component and a second component, the provision of a lubrication apparatus for applying to an advancing yarn a lubricant having at least a first component and a second component, and the provision of a lubrication pump for metering and delivering a lubricant.

In accordance with one aspect of the invention, the method includes advancing separate components of a lubricant in separate feeder flows, combining the feeder flows to form a main flow of the lubricant, and applying lubricant from the main flow to the yarn via a wetting device.

In accordance with another aspect of the invention, the lubricant apparatus includes at least first and second containers for respectively containing first and second components of a lubricant. The lubricant apparatus further includes at least first and second lines respectively communicatively connected to the first and second containers. The first and second components are capable of flowing respectively from the first and second containers via the first and second lines. The lubricant apparatus further includes a feed device having an outlet. The feed device is communicatively connected to both the first and second lines so that the feed device is capable of receiving the first component from the first line and the second component from the second line. The feed device is operative for combining the first component received from the first line with the second component received from the second line to form the lubricant. The feed device is also operative for supplying a main flow of the lubricant at the outlet of the feed device. The lubricant apparatus further includes a wetting device communicatively connected to the outlet of the feed device and thereby capable of receiving the main flow of the lubricant from the outlet of the feed device. The wetting device is operable for applying the lubricant from the main flow to the yarn.

The invention offers the special advantage that the components of the lubricant are combined with one another only directly before applying the lubricant to the yarn. The emulsion develops a short time before it is applied to the yarn. To this end, the components of the lubricant are kept in the separate containers. Each of the containers connects via a separate line to the feed device, which has an inlet channel for each line. Within the feed device, the separate feeder flows carrying the components are combined to form the main flow. Thus, the components of the lubricant are mixed together only in the main flow, and subsequently delivered to the wetting device for lubricating the yarn.

To be able to adjust and maintain a certain mixing ratio between the components, one component is supplied in a metered quantity to a further component and mixed therewith according to an advantageous further development of the invention. In particular in the case that only a very small quantity of a component needs to be added to a basic component, it is possible to adjust the predetermined mixing ratio safely by metering the component of a small quantity.

In a particularly advantageous further development, each feeder flow is associated to a separate metering means. These metering means are controllable independently of one another. As a result, it is possible to adjust and maintain a predetermined mixing ratio of a very high accuracy and constant quality. By changing the individual metered quantities at the metering means, it is possible to change the mixing ratio of the components in a simple manner. The metering means may be constructed, for example, as metering valves which are arranged in the lines between the supply container and the feed device.

To make it possible to construct the lubrication apparatus of the present invention as compact as possible, it is proposed to associate a separate metering means to each inlet channel of the feed device.

Especially advantageous is a variant of the invention in which the metering means are formed each by a controllable metering pump. Thus, the feed device assumes the function of conveying and metering at the same time. A further advantage lies in that the lubricant is delivered to the wetting device in a predetermined metered quantity. The metered quantity that is to be maintained for application to the yarn is composed of the sum of individual metered quantities of the feeder flows.

To obtain an as intensive mixing of the components as possible, the main flow advances through a mixing chamber. Advantageously, in the mixing chamber one or more mixing means are arranged, so that the components of the lubricant can be uniformly mixed together. However, it is also possible to use as a mixing means a dynamic mixer. To this end, use is made of rotating mixing means for mixing the components in the mixing chamber.

For applying the lubricant to the advancing yarn, the lubrication apparatus of the present invention possesses a wetting device. Such wetting devices may be designed and constructed, for example, as a lubrication stick, a lubrication nozzle, or a lubrication roll. In this connection, in particular the stick lubrication and nozzle lubrication will require a metering of the main flow, which is advantageously obtained from individually metering the components.

In accordance with another aspect of the invention, a lubrication pump includes at least one pump inlet and at least one pump outlet, and conveying means communicatively connecting the pump inlet and the pump outlet. The conveying means is responsive to being driven for delivering in a metered volume flow from the pump inlet to the pump outlet. The pump further includes a mixing chamber communicatively connected to and upstream from the pump inlet. The mixing chamber includes a plurality of inlet openings and a plurality of mixing elements. The mixing elements are positioned in the mixing chamber, downstream from the inlet openings, and upstream from the pump inlet.

The lubrication pump of the present invention has the advantage that the components of the lubricant are combined and mixed only within the lubrication pump. Thus, the emulsion develops in the mixing chamber of the lubrication pump a short time before being applied to the yarn. To this end, the lubrication pump includes the plurality of inlet openings to the mixing chamber. In the inlet openings, the separate components are introduced unmetered or metered into the mixing chamber. In the mixing chamber, the plurality of mixing elements are arranged between the inlet openings and the actual pump inlet to provide an intensive mixing of the components. A lubricant combined at a predetermined mixing ratio is thus present at the pump inlet, and delivered by the conveying means of the lubrication pump in a metered volume flow to the pump outlet.

Thus, the lubrication pump of the present invention makes it unnecessary to keep a supply of an emulsified lubricant. As a result, it is possible to change the lubricant as well as vary its concentration in a simple manner. Also, the lubrication pump of the present invention makes it unnecessary to clean the lubricant supply lines to the lubrication pump in the case of a lubricant change or because of bacteria growth in the lubricant, since the feed lines connect to the mixing chamber and the feed lines convey separate components of the lubricant.

In a particularly advantageous further development of the lubrication pump, the mixing elements are mounted at least in part to a mixing shaft extending into the mixing chamber. The mixing shaft is rotatably driven, so that the components of the lubricant undergo an intensive and uniform mixing.

In a particularly preferred variant of the lubrication pump according to the invention, the mixing shaft and the conveying means are driven by a common drive. This permits influencing both the metering and the mixing by a drive control system. In this variant, it will be especially of advantage when the conveying means can be driven by a drive shaft which extends with its one end into the mixing chamber and forms the mixing shaft. To this end, it will be necessary to arrange the mixing chamber and the conveying means in alignment with each other. This results in a particularly compact type of construction of the lubrication pump.

To realize in the mixing chamber an intensive mixing of the lubricant components irrespective of the rotational speed of the conveying means and, thus, irrespective of the metered volume flow, another development of the invention is especially advantageous. In this instance, the drive shaft and the mixing shaft are interconnected by a transmission gearing. Thus, while a common drive remains, it is possible to operate the mixing shaft at substantially different rotational speeds. It is preferred to drive the mixing shaft at higher rotational speeds.

To obtain a uniform, little pulsating volume flow, which can be metered with a high accuracy, the conveying means of the lubrication pump is formed preferably by one or even more paired gears. With the use of a multiple pump with several pairs of gears, each pair of gears is associated with its own pump outlet. The supply to the paired gears is proceeded by a central pump inlet. In such multiple gear pumps, the drive gears are driven together via a drive shaft.

The lubrication pump of the present invention is suitable to supply any desired wetting device, such as, for example, lubrication sticks, lubrication nozzles, or even lubrication rolls.

BRIEF DESCRIPTION OF THE INVENTION

In the following, further advantages of the invention are described in greater detail with reference to some embodiments illustrated in the attached drawings, in which.

DETAILED DESCRIPTION OF THE PREFERRED EMBODIMENTS

Figure 1:
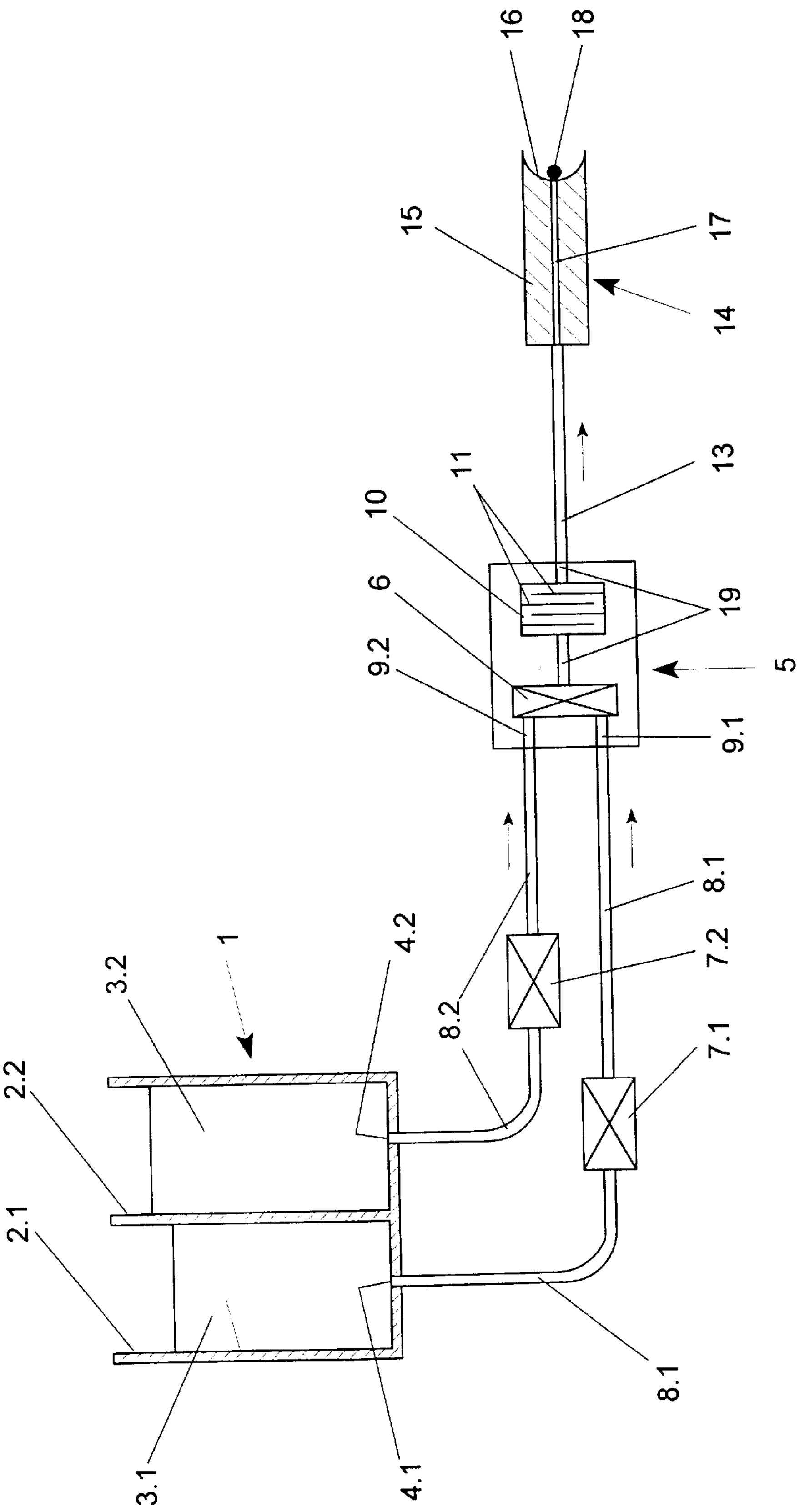
FIG. 1 shows a first embodiment of a lubrication apparatus according to the invention with stick lubrication.

FIG. 1 is a schematic view of a lubrication apparatus according to an embodiment of the invention with stick lubrication. The lubrication apparatus consists of a supply container 1, a feed device 5, and a wetting device 14. The supply container 1 is formed by two separate containers 2.1 and 2.2. The container 2.1 holds a first component 3.1 of a lubricant. A second component 3.2 of the lubricant is kept in container 2.2. On the underside of the container 2.1, an outlet 4.1 is arranged. The outlet 4.1 connects to a line 8.1. The line 8.1 connects the container 2.1 to the feed device 5. Likewise, an outlet 4.2 is formed on the underside of the container 2.2. A second line 8.2 connects to the outlet 4.2. The line 8.2 extends to the feed device 5. In the line 8.1, a metering means 7.1 is arranged between the feed device 5 and supply container 1. The line 8.2 likewise contains a metering means 7.2 between the supply container 1 and feed device 5. The metering means 7.1 and 7.2 may be constructed as electromechanical valves or electrically operated pumps.

On its inlet side, the feed device 5 comprises two inlet channels 9.1 and 9.2, which connect to lines 8.1 and 8.2. In the feed device 5, the inlet channels 9.1 and 9.2 connect to a conveying means 6. The conveying means 6, which consists of one or more sets of gears, connects to an outlet channel 19 that is on the side of the conveying means that is opposite from the inlet channels 9.1 and 9.2. At the outlet side of the feed device 5, a line 13 connects to the outlet channel 19. Inside the feed device 5, a mixing chamber 10 extends, which divides the outlet channel 19 into two partial lengths, of which the first partial length extends between the conveying element 6 and the mixing chamber 10, and the second length between the line 13 and mixing chamber 10. The mixing chamber 10 accommodates a plurality of mixing elements 11. In the embodiment illustrated in FIG. 1, the mixing elements 11 are constructed as baffles that alternately overlap one another, so that the lubricant flowing therethrough is forced to deflect considerably.

The line 13 connects the feed device 5 to a wetting device 14. The wetting device 14 is constructed as a stick lubricator in FIG. 1. To this end, the wetting device 14 comprises a yarn guide 15. At its end, the yarn guide 15 is provided with a yarn track 16, which is in contact with a yarn 18. A channel 17 terminates in the yarn track 16. At its opposite end, the channel 17 connects to line 13.

In the lubrication apparatus shown in FIG. 1, a lubricant is used that is composed of two components 3.1 and 3.2. To this end, the components 3.1 and 3.2 are held in separate containers 2.1 and 2.2. Through the outlets 4.1 and 4.2 as well as lines 8.1 and 8.2, the components 3.1 and 3.2 reach the conveying means 6. In this process, a metering means 7.1 determines the quantity of component 3.1 that reaches the conveying means 6. The quantity of component 3.2 is determined by a metering means 7.2. For example, if the lubricant is mixed from one part of component 3.1 and from two parts of component 3.2, the metering valve 7.2 will let pass twice the quantity of the component per unit time in comparison with metering valve 7.1. With that, a first metered feeder flow of component 3.1 enters the inlet channel 9.1 of the feed device. The metered feeder flow of component 3.2 enters the inlet channel 9.2. The conveying means 6 combines both feeder flows to one main flow and advances it into the outlet channel 19. From the outlet channel 19, the main flow formed by the metered feeder flows enters the mixing chamber 10. In the mixing chamber 10, both components within the main flow undergo an intensive mixing by the mixing elements 11. After leaving the mixing chamber 10, the lubricant is a fully prepared emulsion and enters the line 13 through outlet channel 19. The delivery pressure generated by the conveying means 6 advances the lubricant through line 13 to the wetting device 14. In the wetting device 14, the lubricant flows through channel 17 to the yarn track 16. In the yarn track 16, the yarn 18 receives the lubricant. The main flow of the lubricant is adjusted by the quantity delivered by the conveying means 6 to a predetermined wetting flow, thereby realizing a uniform lubrication of the yarn 18.

Figure 2:
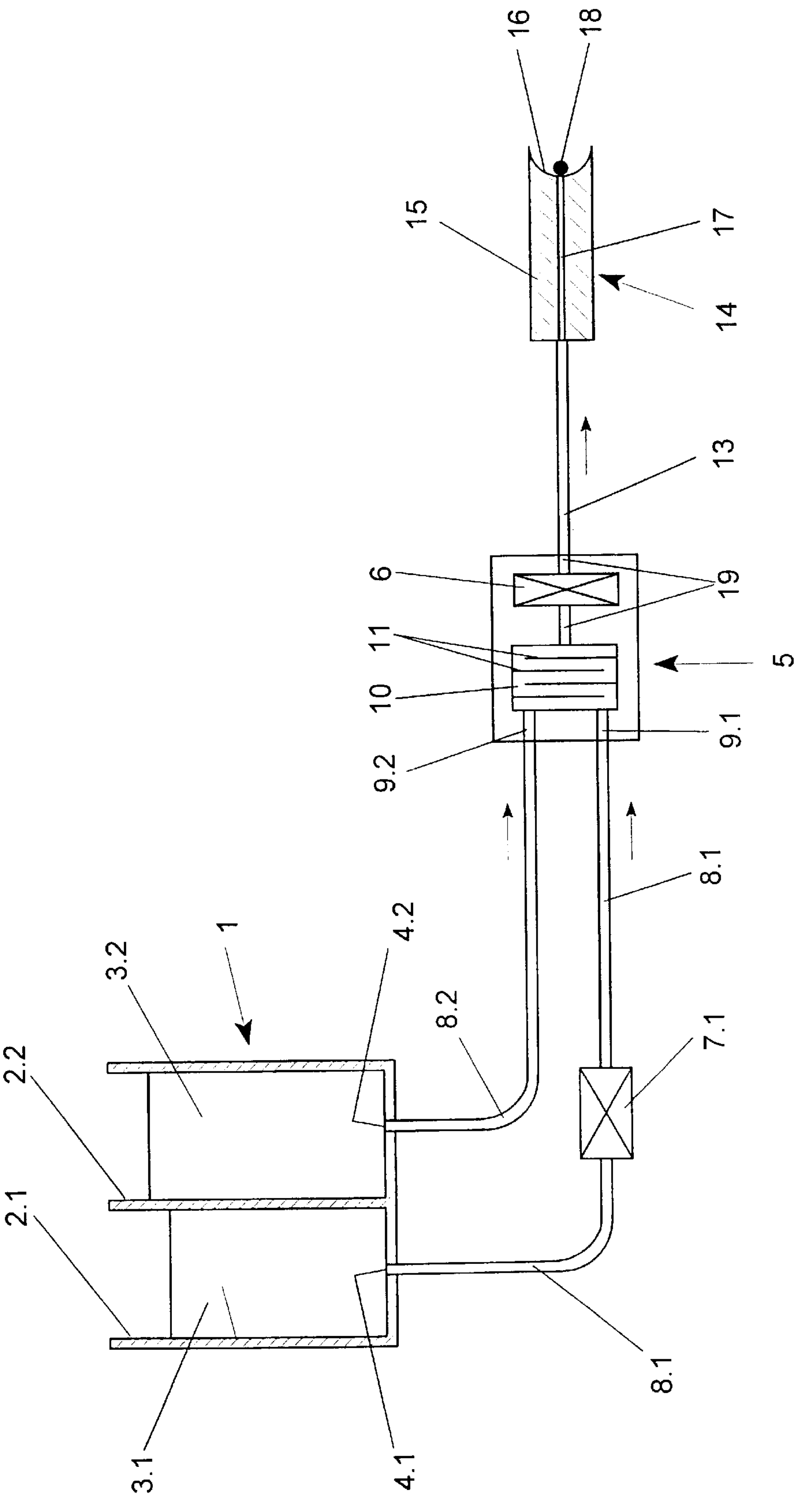
FIG. 2 shows a further embodiment of a lubrication apparatus according to the invention with stick lubrication.

FIG. 2 illustrates a further embodiment of a lubrication apparatus according to the invention with stick lubrication. The lubrication apparatus is constructed substantially identical with the embodiment of FIG. 1. To this extent, the foregoing description is herewith incorporated by reference, and only differences are described in the following. The lubrication apparatus comprises again a supply container 1, a feed device 5, and a wetting device 14. The feed device 5 connects with an inlet channel 9.1, via the line 8.1, to a container 2.1. Between the feed device 5 and the container 2.1, the line 8.1 accommodates a metering device 7.1 for metering the component of the lubricant that advances in the line. A second inlet channel 9.2, of the feed device connects, via the line 8.2, to a second separate container 2.2. Inside the feed device, on its inlet side, a mixing chamber 10 extends, in which inlet channels 9.1 and 9.2 terminate. The mixing chamber 10 accommodates a plurality of mixing elements 11. The mixing chamber 10 connects, via an outlet channel, to a conveying means 6. The conveying means 6 connects, via the outlet channel 19 and line 13 to the wetting device 14.

In the lubrication apparatus shown in FIG. 2, the component of the lubricant kept in container 2.2 advances, via line 8.2 and inlet channel 9.2, directly to the mixing chamber 10. The second component of the lubricant, which is contained in container 2.1, flows via a metering device 7.1 in a measured quantity to the mixing chamber 10. Inside the mixing chamber 10, the components are mixed together. Subsequently, they advance through the conveying means 6, which delivers in this instance the quantity necessary for the wetting device. This arrangement has the advantage that the metering of the components for determining the mixing ratio is adjustable independently of the metering of the emulsion that is required for the lubrication. However, it is also possible that the feed device 5 supplies a plurality of wetting devices 14 arranged side by side. In this instance, it is possible to associate to each wetting device a separate metering means.

Figure 3:
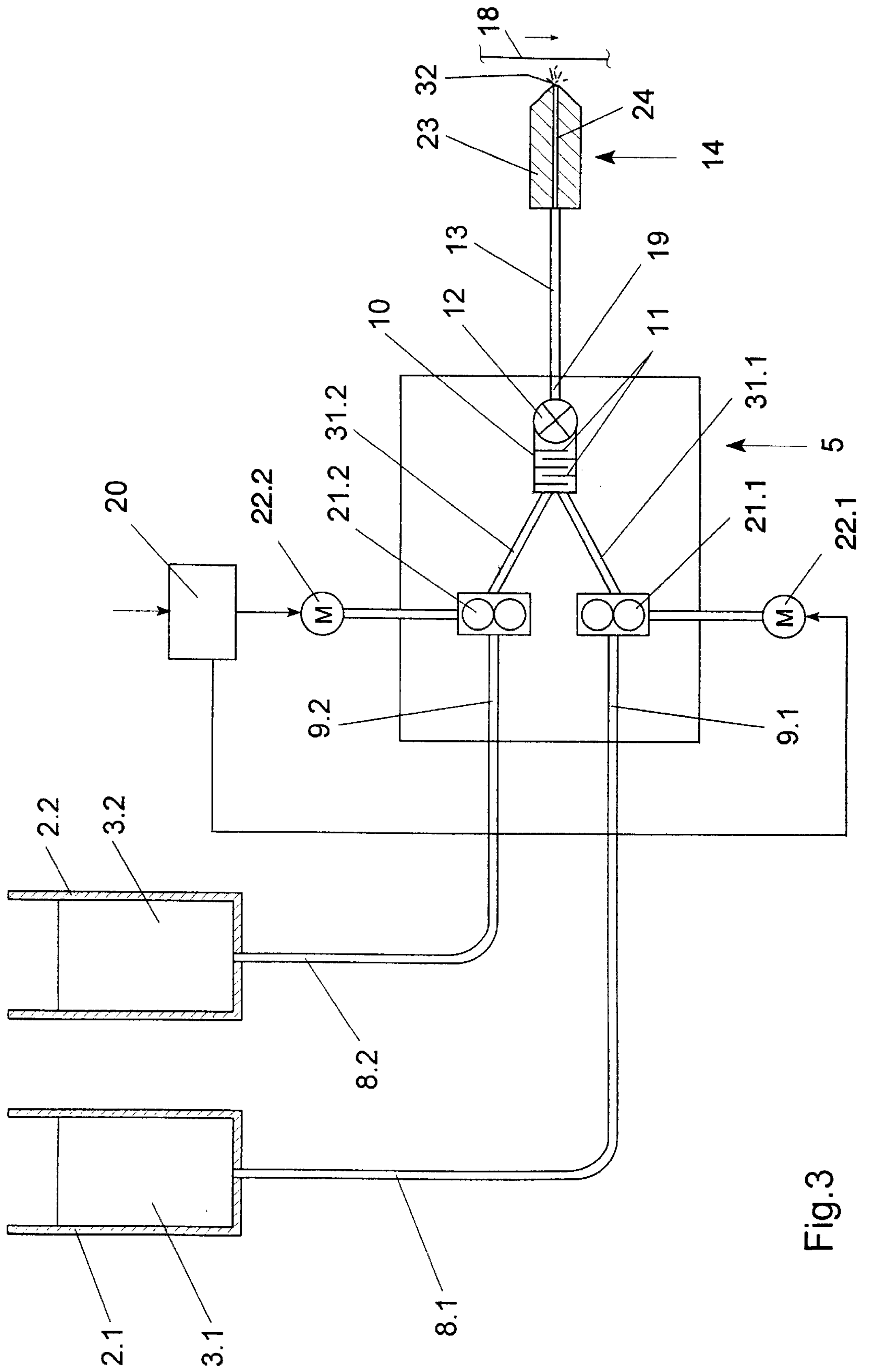
FIG. 3 shows a further embodiment of a lubrication apparatus according to the invention with nozzle lubrication.

FIG. 3 is a schematic view of a further embodiment of a lubrication apparatus according to the invention. In this Figure, structural elements with the same function are provided with identical numerals.

The lubrication apparatus comprises a feed device 5, wherein two separate metering pumps 21.1 and 21.2 form the conveying means. A motor 22.1 arranged outside of the feed device 5 drives the metering pump 21.1. The metering pump 21.2 is driven by a motor 22.2. The motors 22.1 and 22.2 are activated via a controller 20.

In the feed device 5, the metering pump 21.1 is associated to the inlet channel 9.1, and the metering pump 21.2 is associated to the inlet channel 9.2. The outlet of metering pump 21.1 connects to an outlet channel 31.1. The outlet of metering pump 21.2 terminates in an outlet channel 31.2. The outlet channels 31.1 and 31.2 converge in a mixing chamber 10. The mixing chamber 10 accommodates static mixing elements 11 as well as a dynamic mixer 12. The dynamic mixer 12 may be formed, for example, by a rotating shaft that is equipped with mixing elements. On the outlet side of the feed device 5, the mixing chamber 10 connects, via the outlet channel 19, to a line 13.

The line 13 leads to a wetting device 14, which is designed and constructed as a nozzle lubricator. To this end, the wetting device 14 comprises a nozzle 23, which contains a nozzle channel 24. The nozzle channel 24 terminates in a nozzle opening 32, which sprays the lubricant at a distance from an advancing yarn 18. The nozzle channel 24 connects to line 13.

On the inlet side of the feed device 5, the inlet channel 9.1 connects, via line 8.1, to the container 2.1. The container 2.1 holds a component 3.1 of the lubricant. The inlet channel 9.2 connects, via line 8.2, to the container 2.2, which contains a further component 3.2 of the lubricant.

In the lubrication apparatus shown in FIG. 3, the metering pumps 21.1 and 21.2 meter the components 3.1 and 3.2 in their quantity, and simultaneously advance them as feeder flows into the mixing chamber 10. The delivery and metering of the feeder flows are controlled via the controller 20. To this end, the motors 22.1 and 22.2 are frequency controlled by controller 20. As a result, the feeder flows are delivered at a certain quantity ratio into the mixing chamber 10. In the mixing chamber 10, the feeder flows undergo an intensive mixing by the mixing elements 11 and the mixer 12. The lubricant mixed as an emulsion then enters line 13 via the outlet channel 19. As a result of the delivery pressure generated by the metering pumps 21.1 and 21.2, the lubricant is sprayed as a fine mist from nozzle channel 24 through the nozzle opening 32. In this process, drops of the lubricant settle uniformly on the advancing yarn 18.

In the embodiment illustrated in FIG. 3, the metering pumps 21.1 and 21.2 may be formed, for example, by micropumps, which are capable of metering a liquid in a wide spectrum from some few to several thousand drops per second. With that, it is easily possible to apply the lubricant, depending on the yarn thickness, in a range from 1 $cm^3$ per minute to 20 $cm^3$ per minute. In the case of such micropumps, gear sets or diaphragms are used a conveying means.

Figure 4:
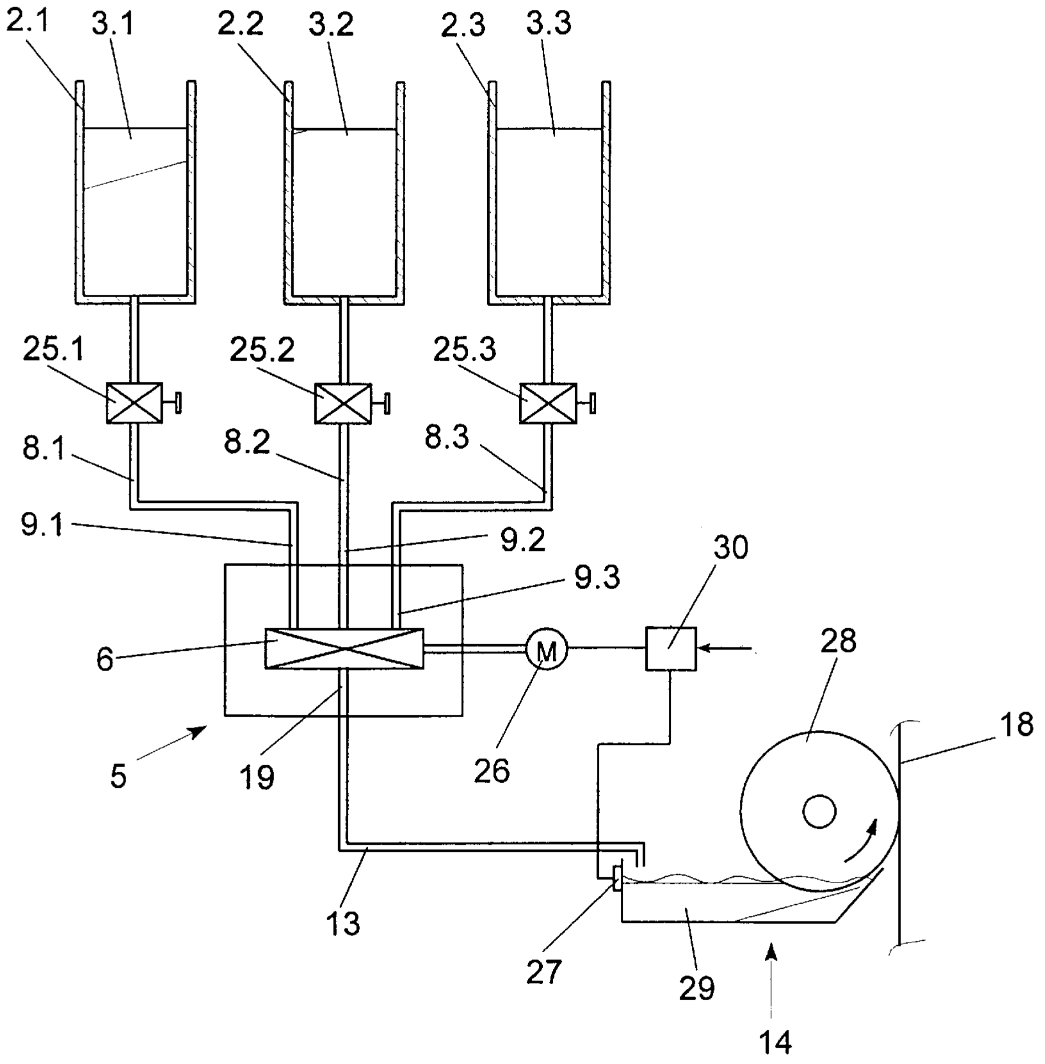
FIG. 4 shows a further embodiment of a lubrication apparatus according to the invention with roll lubrication.

FIG. 4 is a schematic view of a further embodiment of the lubrication apparatus according to the invention. In this embodiment, the lubricant is applied to the yarn 18 by a rotating roll 28, with the yarn 18 being guided in contact with its circumference. The roll 28 partially immerses into a container 29 that is filled with the lubricant. As a result, the surface of roll 28 is evenly wetted with the lubricant. The lubricant is filled into the container 29 via a feed device 5. To this end, the level of the lubricant in container 29 is monitored by a level switch 27. The level switch 27 is coupled with a controller 30. The controller 30 connects to a motor 26, which drives a conveying means 6 of feed device 5.

The conveying means 6 connects via three separate inlet channels 9.1, 9.2, and 9.3 and their respectively connected lines 8.1, 8.2, and 8.3, to three containers 2.1, 2.2, and 2.3. Each of the containers 2,1, 2.2, and 2.3 holds respectively one component 3.1, 3.2, and 3.3 of the lubricant. For metering or adapting the mixing ratio, the connecting lines 8.1, 8.2, and 8.3 accommodate each a metering valve 25.1, 25.2, and 25.3. With respect to their rate of flow, the metering valves 25.1, 25.2, and 25.3 can be infinitely varied by hand. Thus, the components 3.1, 3.2, and 3.3 advance to the conveying means at a predetermined quantity ratio. In the conveying means 6, the feeder flows of components 3.1, 3.2, and 3.3 are combined to a main flow, and delivered via an outlet channel 19, through line 13 to the container 29.

In the apparatus shown in FIG. 4, the components are mixed and advanced directly in the conveying means 6 of feed device 5. The conveying means 6 may be, for example, a set of planetary gears, wherein each feeder flow is advanced by a set of gears and subsequently combined to a main flow. However, a feed of the components will occur only when the level of the lubricant in container 29 has reached a limit value, which is detected by the level switch 27. The level switch 27 signals to the controller 30 that a refill of container 29 is needed. Subsequently, the motor 26 is activated, so that the conveying means 6 starts to deliver the components and the container 29 is refilled with the lubricant. As soon as a maximum level of the lubricant is reached in the container 29, the level switch 27 and controller 30 will stop the motor 26 so that the delivery of the components will discontinue.

The embodiments shown in FIGS. 1–4 are exemplary as regards the combination of the feed device 5 and wetting device 14. The illustrated wetting devices 14 and feed devices 5 may optionally be combined in a manner not shown. In addition, it is also possible to connect a plurality of wetting devices jointly to one feed device. The wetting devices will be supplied parallel to one another.

The lubrication apparatus of the present invention and the method of the invention are not limited to keeping a supply of one component of the lubricant per container. A container may also hold a mixture of several components. Shortly before its application to a yarn, it will be possible to add to the mixture a further component, for example, an additive.

Figure 5:
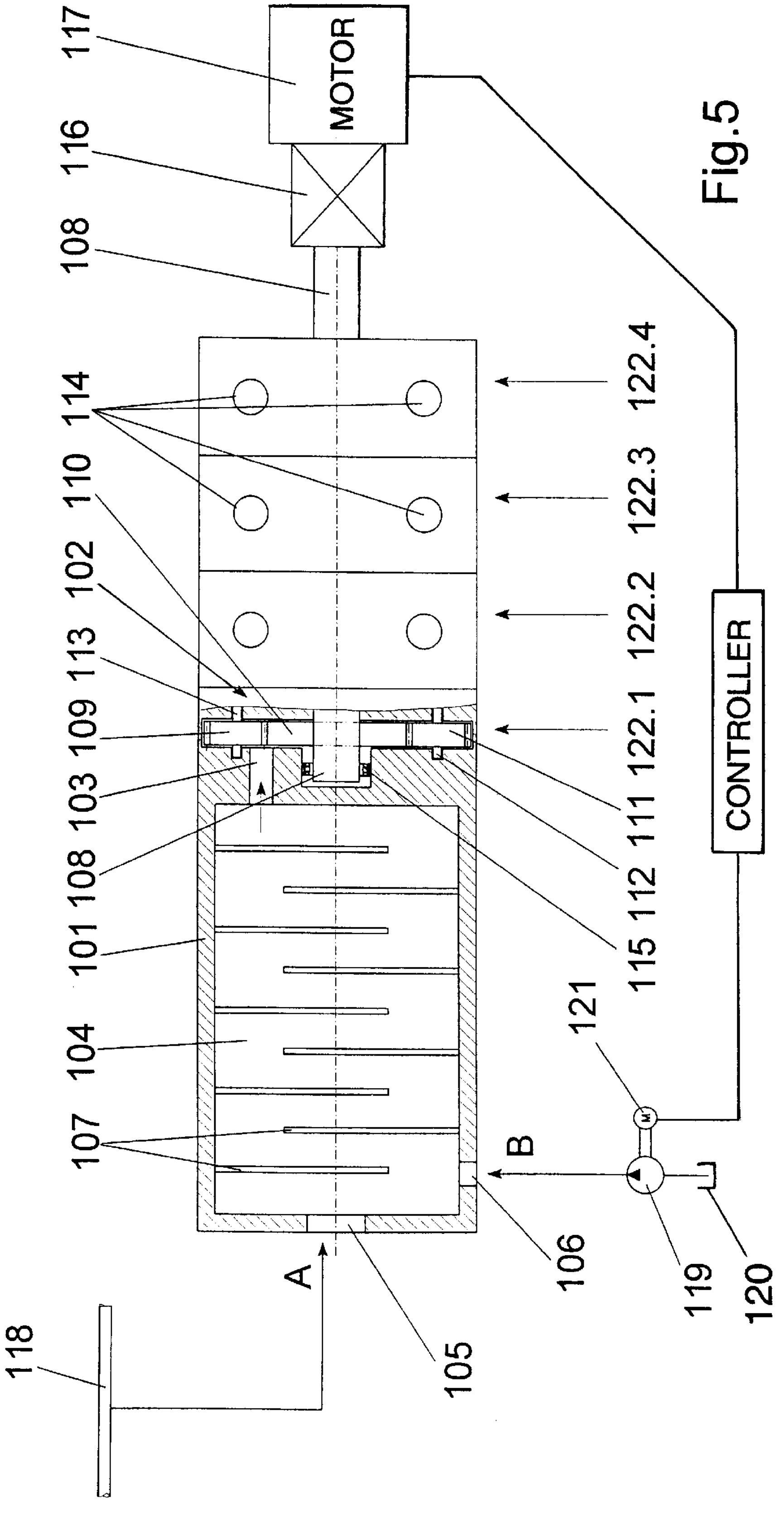
FIG. 5 shows a first embodiment of a lubrication pump according to the invention without a mixing shaft.

FIG. 5 is a schematic view of a first embodiment of a lubrication pump according to the invention. The lubrication pump could be used, for example, as a feed device 5 in the lubrication apparatus of FIG. 2. The lubrication pump is constructed as a multiple pump, and consists of joined pumps 122.1, 122.2, 122.3, and 122.4. Each of the pumps 122 accommodates a conveying means 102. The conveying means 102 consists of gears 109, 110, and 111. In this arrangement, the pair of gears 109 and 110 and the pair of gears 111 and 110 form a pump unit, which meters and delivers a volume flow. Thus, each pump 122 forms a double pump with two separate outlets 114. The pump shown in FIG. 5 is thus constructed as an octuple pump. All pumps 122.1–122.4 connect to a pump inlet 103. The pumps 122.1–122.4 are jointly driven via a drive shaft 108. At its one end, the drive shaft 108 connects via a coupling 116 to a motor 117. At its opposite end, the drive shaft 108 is supported by means of a bearing 115 in a pump housing 101. The drive shaft 108 mounts and drives the respective center gears 110 of pumps 122.1–122.4. To this end, FIG. 5 shows a sectional view of pump 122.1 and a side view of pumps 122.2–122.4.

The gears 109 are mounted for rotation on a shaft 113, and the gears 111 on a shaft 112.

In the axial extension of drive shaft 108, the pump housing 101 accommodates a mixing chamber 104 directly upstream of the pump inlet 103. At the end of the pump housing 101, the mixing chamber 104 has two inlet openings 105 and 106 that terminate in the mixing chamber 104. Inside the mixing chamber 104, the pump house 101 mounts a plurality of mixing elements 107. The mixing elements 107 are, for example, offset opposite to one another, and overlap in the interior of the mixing chamber, so that the volume flows entering through inlet openings 105 and 106 advance through the mixing chamber 104 by repeated deflections. On the side of the mixing chamber 104 opposite to the inlet openings 105 and 106, the pump housing 101 accommodates the pump inlet 103. The pump inlet 103 forms here the outlet for the mixing chamber 104.

To describe in greater detail the operation, FIG. 5 schematically illustrates the feed to the lubrication pump via the inlet openings 105 and 106. Through inlet opening 105, a component A of the lubricant is diverted unmetered, for example, from a supply line 118, and caused to enter mixing chamber 104. For example, the component A could be water. A second component B of the lubricant is caused to enter the mixing chamber 104 through the second inlet opening 106. To this end, the component B, for example, an oil, is fed from a container 120 through a metering pump 119 in a metered volume flow into the mixing chamber 104. The metering pump 119, which is driven by a controlled motor 121, may be constructed as a single pump or even as a multiple pump.

Within the mixing chamber 104, the components A and B are mixed to an emulsion or a mixture. The emulsified lubricant then reaches the conveying means 102 via pump inlet 103. The conveying means 102 divides the main flow into eight metered individual flows, which are delivered through the pump outlets to connected wetting devices not shown. In this process, the quantity is predetermined by the rotational speed of the drive shaft.

To be able to adjust a certain mixing ratio between the components A and B, the rotational speed of the metering pump 119 is controlled as a function of the rotational speed of the drive shaft 108. For example, to add component B in a proportion of 10% by volume, the metering pump 119 would have to be adjusted to a volume flow of 0.25 $cm^3$ per minute at a total delivery of the lubrication pumps of 2.5 $cm^3$ per minute.

Therefore, it is advantageous to connect the motor 121 and motor 117 to a controller, in which both the metered main volume flow and the mixing ratios are predetermined, so that the motors can be activated accordingly.

In the lubrication pump illustrated in FIG. 5, the mixing chamber comprises two inlet openings 105 and 106 for respectively two components A and B of the lubricant. This arrangement is exemplary. The lubrication pump is also suitable for lubricants, which consist of three, four, or more components. Accordingly, the mixing chamber 104 would comprise several inlet openings. However, it is also possible that a plurality of components of the lubricant jointly enter the mixing chamber through one inlet opening.

Figure 6:
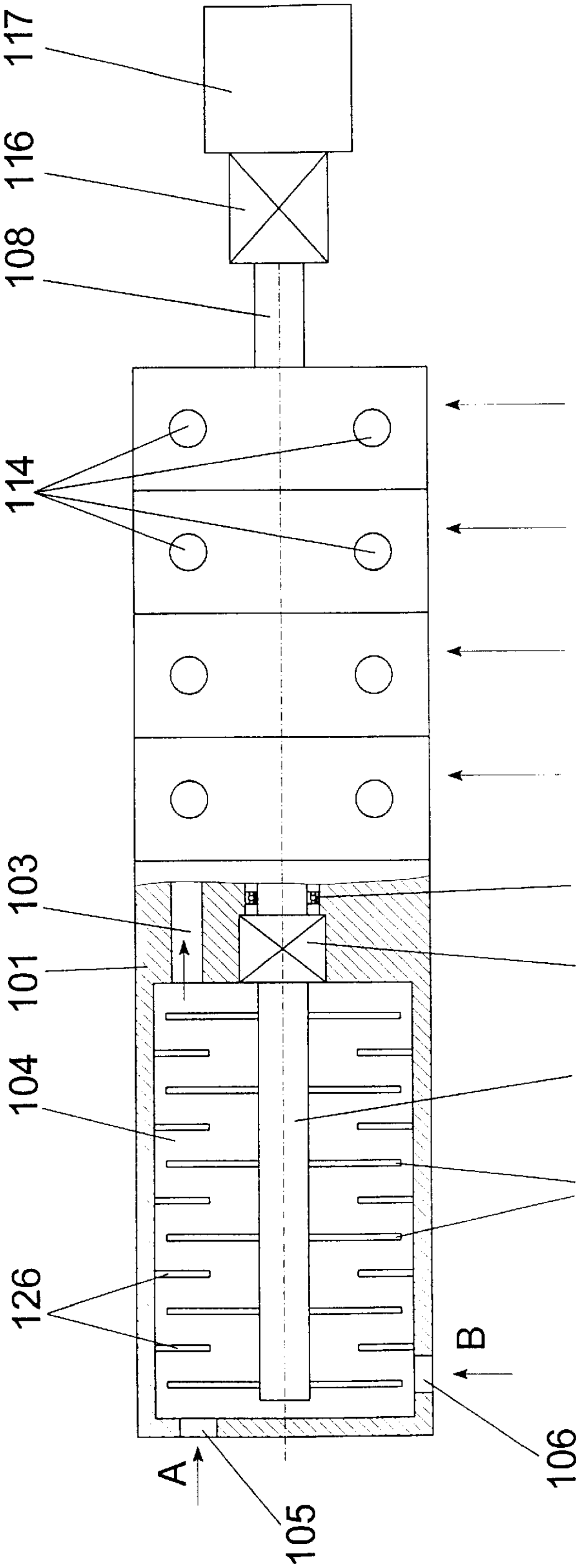
FIG. 6 shows a further embodiment of a lubrication pump according to the invention with a mixing shaft.

FIG. 6 illustrates a second embodiment of a lubrication pump according to the invention with a mixing shaft. The lubrication pump illustrated in FIG. 6 is in its construction and in its operation substantially identical with the embodiment shown in FIG. 5. To this extent, the foregoing description of FIG. 5 is herewith incorporated by reference.

The lubrication pump of FIG. 6 is likewise constructed as a multiple pump with a total of eight pairs of gears and eight pump outlets. Differently from the embodiment shown in FIG. 5, a separate mixing shaft 124 extends in the axial direction from the drive shaft 108 into the mixing chamber 104. The mixing shaft 124 connects via a transmission gearing 123 to the drive shaft 108. Thus, the mixing shaft 124 is driven together with the drive shaft 108 by the motor 117. The circumference of the mixing shaft 124 mounts a plurality of mixing elements 125 one after the other in spaced relationship. The mixing elements 125 correspond with a plurality of mixing elements 126 mounted to the pump housing 101. The mixing elements 126 are stationary.

By the rotation of the mixing shaft 124, the components A and B of the lubricant entering the mixing chamber 104 through inlet openings 105 and 106 are mixed. The end of the mixing chamber 124, through which components A and B advance, forms the pump inlet 103. With that, the pumps 122 or the pump inlet 103 receive a freshly emulsified lubricant. The pumps 122 deliver metered volume flows of the lubricant to the pump outlets 114. From the pump outlet, the lubricant reaches a wetting device downstream of the lubrication pump.

In the embodiment shown in FIG. 6, a transmission gearing 123 is provided between the mixing shaft 124 and the drive shaft 108. This permits driving the mixing shaft 124 by the drive 117 at a higher rotational speed, so that the components of the lubricant are thoroughly and uniformly mixed before delivery.

The mixing elements formed on the mixing shaft may be, for example, perforated disks, slotted disks, or pins.

In the cases, wherein the conveying means of the lubrication pump is operated at higher rotational speeds, it is also possible that the drive shaft 108 projects with its end on the bearing side into the mixing chamber 104. In this instance, the mixing shaft is formed by the end of the drive shaft 108.

The end of the drive shaft may mount the mixing elements shown in FIG. 6.

The embodiments shown in FIGS. 5 and 6 may be combined with any desired wetting device. In particular in the case of the above-described stick and nozzle lubrication systems, it will be advantageous to meter the delivery by the lubrication pump.

That which is claimed:

1. A lubrication apparatus for applying to an advancing yarn a lubricant which is composed of at least a first component and a second component, the lubricant apparatus comprising:

a first container capable of containing the first component;

a second container capable of containing the second component;

a first line communicatively connected to the first container and through which the first component is capable of flowing from the first container;

a second line communicatively connected to the second container and through which the second component is capable of flowing from the second container;

a feed device comprising an outlet, wherein the feed device is communicatively connected to both the first and second lines, and wherein the feed device is capable of receiving the first component from the first line and the second component from the second line, the feed device being configured for combining the first component received from the first line with the second component received from the second line to form the lubricant, and the feed device being configured for supplying a main flow of the lubricant at the outlet of the feed device; and a wetting device communicatively connected to the outlet of the feed device and capable of receiving the lubricant from the outlet of the feed device, wherein the wetting device is operable for applying the lubricant to the yarn, wherein the feed device comprises a mixing chamber which is configured for receiving the first component and the second component and for combining the first component with the second component, and wherein the mixing chamber comprises mixing means for mixing the first and second components, wherein the feed device defines a flow path leading from the first and second lines to the outlet, and wherein the feed device further comprises a lubrication pump positioned in the flow path for metering and delivering the lubricant, and the mixing chamber has a plurality of mixing elements positioned in the flow path, with one of the pump and mixing chamber connected to the first and second lines and the other of the pump and mixing chamber connected to the outlet, said lubrication apparatus further comprising a metering device connected in at least one of the first line and the second line, and a controller connected to the pump and to the metering device so that both the flow delivered by the pump and the mixing ratio of the first and second components as determined by the metering device may be adjusted.

2. A lubrication apparatus according to claim 1 wherein the lubrication pump comprises a pump inlet;

a pump outlet;

conveying means communicatively connected between the pump inlet and the pump outlet, wherein the conveying means is responsive to being driven for delivering in a metered volume flow from the pump inlet to the pump outlet; and said mixing chamber being communicatively connected to and upstream from the pump inlet.

3. A lubrication apparatus according to claim 2, wherein the conveying means of the pump comprises paired gears associated with the pump outlet.

4. A lubrication apparatus according to claim 2, wherein:

the lubrication pump further comprises a plurality of pump outlets; and the conveying means comprises a plurality of paired gears, wherein each pair of gears is associated with a respective pump outlet of the plurality of pump outlets.

5. A lubrication apparatus according to claim 4, wherein the pump further comprises a drive shaft, wherein each pair of gears is driven by the drive shaft and the paired gears are constructed and arranged so that each pair of gears is operative to provide the same metered volume flow.

6. A lubrication apparatus according to claim 1 wherein the mixing chamber is located in the flow path upstream of the pump.

7. A lubrication apparatus according to claim 1, wherein:

the wetting device is selected from the group consisting of a first wetting device, a second wetting device, and a third wetting device;

the first wetting device comprises:

a yarn guide comprising a yarn track for being in contact with the yarn, and a channel communicatively connected to the outlet of the feed device and capable of receiving the lubricant from the outlet of the feed device, wherein the channel terminates in the yarn track and is capable of providing the lubricant to the yarn track;

the second wetting device comprises a nozzle comprising an inlet and outlet, wherein:

the inlet of the nozzle is communicatively connected to the outlet of the feed device and capable of receiving the lubricant from the outlet of the feed device, the outlet of the nozzle is directed toward the yarn, and the outlet of the nozzle is in communication with the inlet of the nozzle so that the lubricant is capable of emerging from the outlet of the nozzle; and the third wetting device comprises:

a container communicatively connected to the outlet of the feed device and capable of receiving the lubricant from the outlet of the feed device, and a rotatable roll comprising a circumference for extending into the container and receiving the lubricant and further for being in contact with the yarn and applying the lubricant to the yarn.

* * * * *